3,443,897
PROCESS FOR PREPARING PIGMENTARY
METAL OXIDE
William L. Wilson and Franklin Strain, Barberton, and
Howard H. Hoekje, Akron, Ohio, assignors to PPG
Industries, Inc., Pittsburgh, Pa., a corporation of
Pennsylvania
Continuation-in-part of application Ser. No. 354,597,
Mar. 25, 1964. This application Apr. 7, 1965, Ser.
No. 446,313
Int. Cl. C01g 23/04; C09c 1/36
U.S. Cl. 23—202          10 Claims

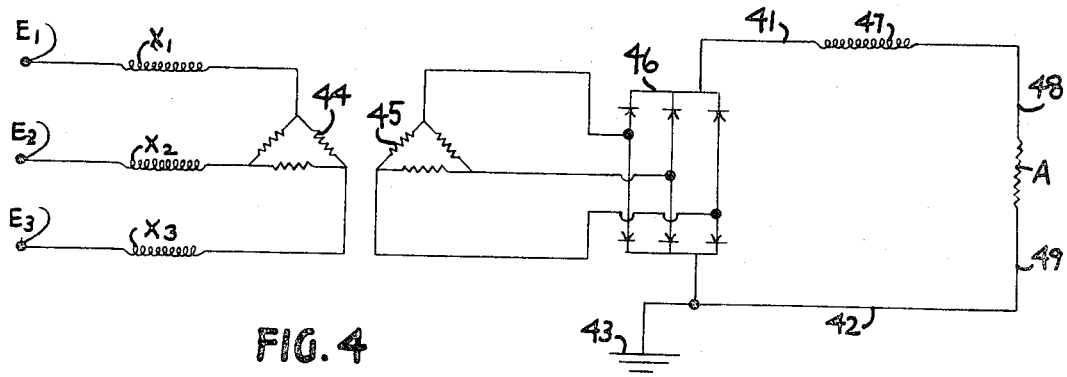
FIG. 4
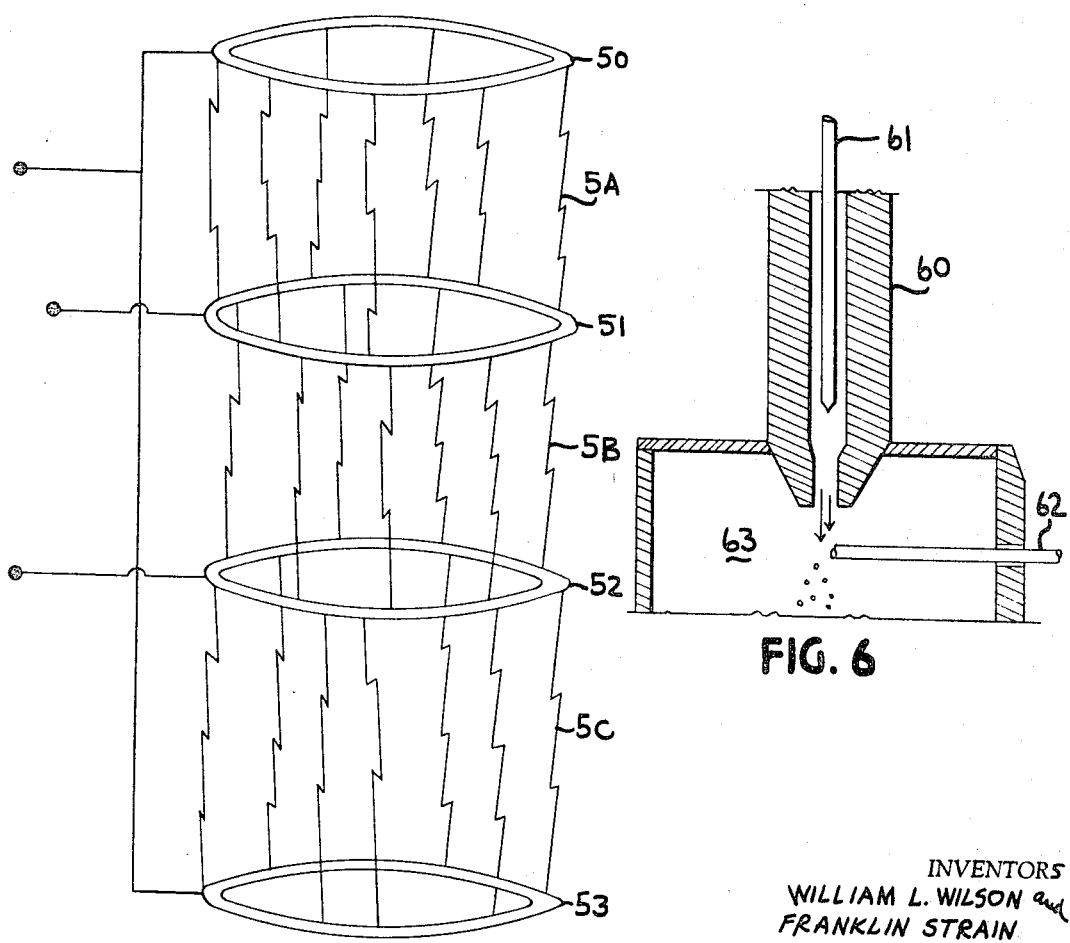
FIG. 5
FIG. 6
INVENTORS
WILLIAM L. WILSON and
FRANKLIN STRAIN
HOWARD H. HOEKJE
BY Chisholm and Spencer
ATTORNEYS United States Patent Office 3,443,897
Patented May 13, 1969

ABSTRACT OF THE DISCLOSURE

Metal oxides, e.g., titanium dioxide, are prepared by vapor phase oxidation of metal halide, e.g., titanium tetrachloride, in a reaction space supplied with heat energy from a gaseous stream heated by electrical energy. A method for heating gas with an electric arc and forwarding the heated gas to the reaction zone is described.

This application is a continuation-in-part of copending U.S. Letters Patent application Ser. No. 354,597, filed Mar. 25, 1964.

This invention relates to the production of metal oxides, notably pigmentary white metal oxides. More specifically, this invention involves the production of metal oxides, particularly pigmentary titanium dioxide by a vapor phase oxidation process.

In the production of metal oxides by vapor phase oxidation of one or more metal halides either in the presence or absence of a fluid bed, a metal halide is oxidized by reaction in the vapor phase state with an oxygenating gas such as oxygen, oxygen-containing gas, air, oxides of nitrogen or phosphorus in a relatively confined area maintained at a temperature at which the halide and oxygenating gas react. Where the reactants are, for example, $TiCl_4$ and $O_2$, the temperature of reaction is above 500° C., preferably 900° C. to 1500° C.

Although the reaction of $TiCl_4$ and $O_2$ is highly exothermic, the evolved heat is inherently carried away from the reaction zone by the $TiO_2$ effluent product stream or lost through the reactor walls. It is therefore necessary to add large quantities of heat both to initiate the reaction and to sustain it.

In the practice of this invention, heat is supplied to the vapor phase oxidation reaction zone by means of an electric arc or radio frequency induction heater. Hereinafter, the term plasma arc will be employed as a synonym for electric arc.

In accordance with this invention, the production of pigmentary white metal oxide pigments, e.g., titanium oxide, by the vapor phase oxidation of metal halide is accomplished efficiently by generating and adding nucleation agents for such oxidation from one or more electrodes of a plasma arc. Thus, at least one of the plasma arc electrodes contains a metal which may be gradually and controllably introduced into a gas atmosphere or stream and which forms a white metal oxide upon oxidation to serve as the nucleating agent or source thereof. Such electrode material is preferably dispersed and eroded into a gas stream passing through the arc by gradual but tolerably slow deterioration and vaporization of the electrode.

In this invention one or more of the electrodes consists essentially of a metal which forms a white oxide. The term metal as employed herein is defined as including these elements exhibiting metal-like properties including the metalloids.

Examples, not by way of limitation but by way of illustration, of such metals which form a white oxide are aluminum, arsenic, barium, beryllium, boron, calcium, gadolinium, germanium, hafnium, lanthanum, lithium, magnesium, phosphorus, potassium, samarium, scandium, silicon, sodium, strontium, tantalum, tellurium, terbium, thorium, thulium, tin, titanium, yttrium, ytterbium, zinc, zirconium, niobium, gallium, antimony.

Some of the metals are too soft and have insufficient structural strength, particularly at elevated temperatures, to be employed as an electrode, as for example silicon, in which case an appropriate compound of the metal may be employed, e.g., silicon carbide. Other carbides which may be employed are $Al_4C_3$, TiC, ZrC. Likewise, various alloys of the metals may be employed if necessary to obtain added strength.

If two different nucleating agents are to be added to the reaction zone, then it is possible to construct the anode and cathode out of different metals, for example, aluminum and silicon, zirconium and silicon, hafnium and silicon, silicon and potassium, aluminum and potassium, aluminum and sodium, magnesium and boron, zinc and silicon, magnesium and antimony, zirconium and thorium, aluminum and thorium, titanium and aluminum, titanium and silicon, and titanium and zirconium. However, as noted above, the silicon should preferably be in the form of silicon carbide (SiC).

In the production of $TiO_2$ and other metal oxides by vapor phase oxidation, the nucleating metal particles from the electrode are added to the reaction zone to aid in the formation of pigmentary metal oxide product. The nucleating particles are added to either one or more of the reactants or to another gas stream, e.g., an inert gas, before introduction to the reaction zone or such particles are introduced directly into the reaction zone independently of any gas stream. Such nucleating agents, not by way of limitation include the oxides and/or salts of metals which form white metal oxides upon oxidation, for example, the metals hereinbefore listed. Examples of such salts are carbides, halides, and carbonates. Furthermore, the pure metal emitted from the electrodes can be added as a nucleating agent.

In the generation of a plasma or electric arc, two or more electrodes are separated by a gap through which a gas flows and across which the arc current passes. Although many design variations and geometric arrangements are feasible, this invention will be described with reference to an arrangement comprising two cylindrical electrodes separated by an annular gap. Reference is made to the drawing and the figures thereon.

In FIGURE 1 there is shown a cylindrical coaxial electrode configuration consisting of a central inner electrode and a surrounding concentric outer electrode.

In FIGURE 2 there is shown two concentric ring electrodes separated by an annular gap, a toroidal figuration.

FIGURE 4 shows one particular electric circuit for the operation of this invention.

FIGURE 5 shows an electric circuit for the operation of this invention wherein four or more electrodes are employed.

FIGURE 6 illustrates a further practice of this invention wherein three electrodes are employed.

Figure 1:
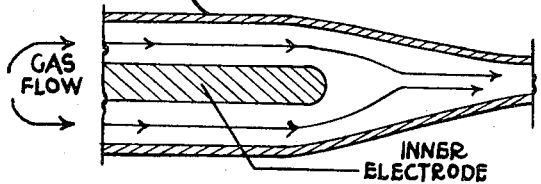
Figure 2:
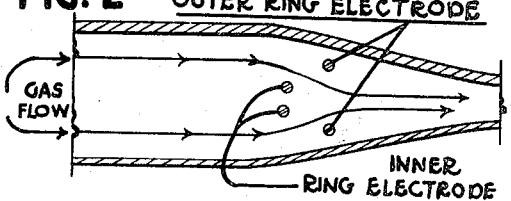

In each of the arrangements disclosed in FIGURES 1 and 2, either electrode may serve as the anode or cathode by merely reversing the polarity. Although both figures show the gas flow chamber as comprising a converging duct to accelerate the gas flow, it is also possible to provide a chamber without a converging duct.

Although only two general electrode arrangements have been disclosed in FIGURES 1 and 2, it is to be understood that other arrangements are within the skill of an expert in the art and within the intended scope of this invention.

In the operation of the plasma arc generator, an A.C. or D.C. voltage potential is established between the electrodes while a gas flows through the electrodes' gap.

Once a voltage difference exists, an electric current will flow between the two electrodes, the magnitude of the current being dependent upon the magnitude of the voltage difference, the nature of the gas, the gas pressure and temperature, and the distance between the electrodes.

The shape of the electrodes is also a controlling factor. Thus, the current flow between a short point and a flat plate is greater than a current flow between two flat plates assuming all other conditions equal.

When a gas passes through a plasma arc, there will be an increase of energy in the gas which will be based not only on the thermal energy of the gas, but also on molecular disassociation since a certain portion of the gas molecules will be ionized and disassociated by the high energy of the arc. This disassociation of the molecules will require energy input which will not be reflected in the immediate thermal energy of the gas. However, when the gas stream is subsequently cooled and the molecules recombined, the corresponding disassociation energy is freed and is then reflected in the kinetic energy of the gas stream.

Figure 3:
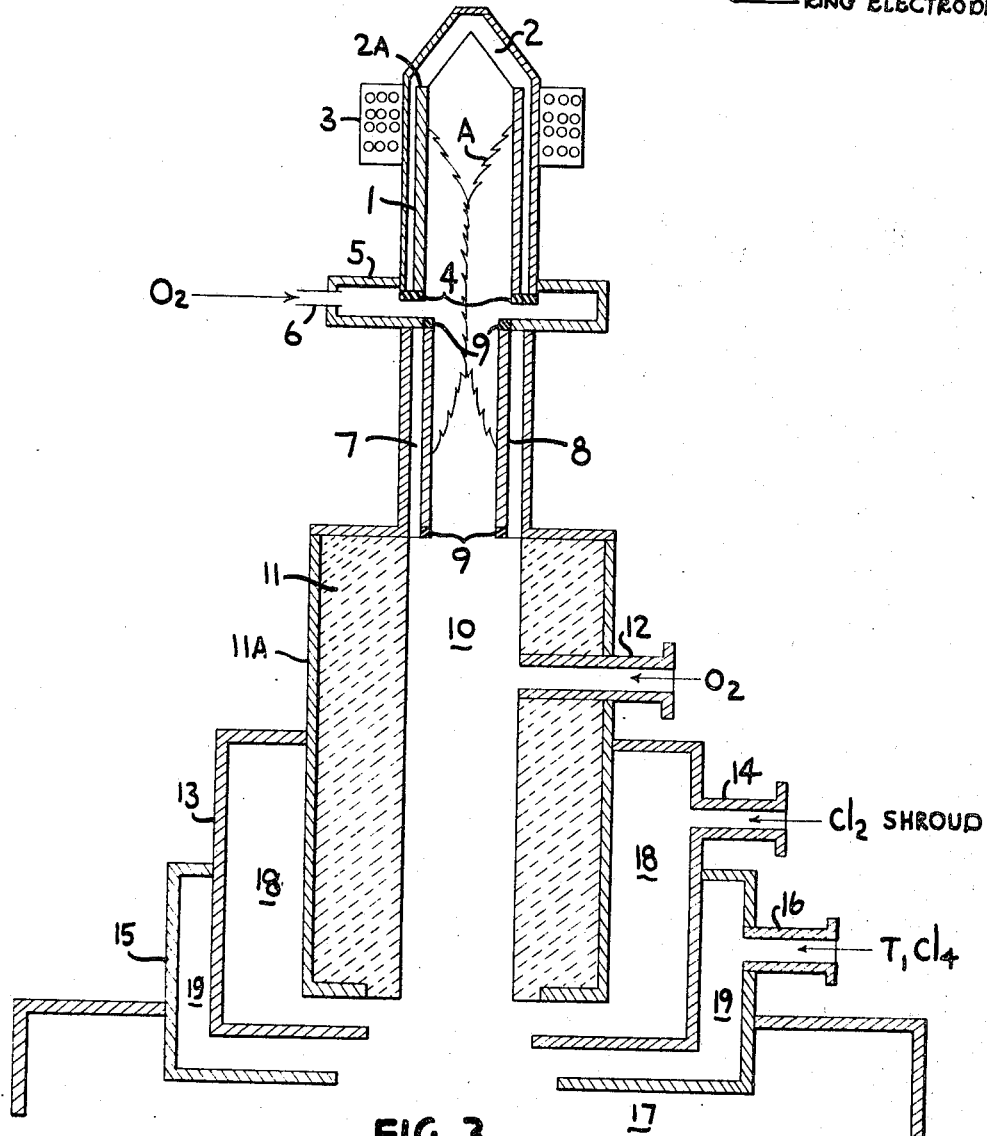
FIGURE 3 shows a particular plasma arc process for the heating of oxygen for use in a vapor phase oxidation zone.

Referring to FIGURE 3, there is shown an upper or back electrode 1 in the form of a cylinder surrounded by a water cooling jacket 2 through which water or any suitable cooling medium may be circulated by any convenient and conventional means. The water inlet and outlet for the jacket are not illustrated. Surrounding the electrode cooling jacket 2 is a magnetic field coil 3 which serves to stabilize the upper end of the arc at electrode 1 and extend the life of electrode 1 by keeping the upper termination of the arc moving by means of the rotational vector of the magnetic field produced by interaction of the magnetic field with the arc current. Although the field and current are preferably set at about 400 amps and 20 to 30 volts in order to stabilize the arc, this variable has little effect on the ultimate feeding operation of the system. Magnetic field means for preventing overly rapid electrode deterioration and erosion are disclosed in U.S. Letters Patent 2,768,947.

There is also shown a lower electrode 8 in the shape of a cylinder surrounded by cooling jacket 7. Electrode 8 is coaxial to electrode 1 but has a smaller diameter. Where A.C. (alternating current) is employed, insulation 9 is provided at each respective end of the electrode cylinder 8, and insulation 4 provided for electrode 1. Where D.C. (direct current) is used, insulation is removed so as to ground one electrode, e.g., insulation 9 is removed from electrode 8.

Oxygen or an oxygen-containing gas (e.g., air) is fed through at least one jet inlet 6 at a high velocity, e.g., the speed of sound, tangentially to the inner wall of cylindrical casement or swirl chamber 5 which is so located between the lower portion of electrode 1 and the upper portion of electrode 8.

The oxygen gas flows as a swirling stream within the chamber 5 and accelerates as it swirls in a decreasing circular path. The swirling stream exits from the chamber 5, the exit path leading upwardly into the inside of the large diameter electrode 1 such that the oxygen flows initially upwardly around the inside circumference of electrode 1. As the stream reaches the blocked end 2A of back or upper electrode 1, it must again accelerate and seek a still smaller circular path. Such smaller path is defined by the diameter of front electrode 8 which leads to freedom through the reaction chamber 17. Thus, the stream flows downwardly in a swirling circular path into the inside diameter of electrode 8. In so doing, the gas thereby passes in a swirling motion through arc A wherein the stream is ionized and heated to an appropriate temperature. The gas then passes around the inside circumference of electrode 8.

After the oxygen gas is ionized and heated by means of the electric arc A, the gas passes downwardly into passage 10 wherein it is mixed and cooled with cooler secondary oxygen is of a sufficient temperature and quantity such that the resulting mixture of the two $O_2$ streams has an average temperature in excess of about 1900° C., rarely above 2500° C.

There is also shown in FIGURE 3, tubes 13 and 15 which are coaxial with and concentric to passage 10. Passage 10 is insulated from tubes 13 and 15 by means of ceramic refractory 11 supported and retained by wall 11A.

The mixed oxygen stream passes out of the passage 10 into the $TiO_2$ vapor phase oxidation reaction zone chamber 17, the stream being externally surrounded by a concentric chlorine stream or shroud emitted from the annulus 18 of concentric tube 13. The chlorine stream is in turn externally surrounded by a concentric stream of $TiCl_4$ emitted from the annulus 19 of concentric tube 15. Nozzle 16 is provided for introducing the $TiCl_4$ into the upper portion of annulus 19 of concentric tube 15. Nozzle 14 is provided for introducing the chlorine into the upper portion of annulus 18 of tube 13.

As is further shown in FIGURE 3, plasma arc or ionization zone A is preferably positioned radially and visually in the line of sight in the reaction zone chamber 17, that is, the two zones are positioned in a straight line less than 0.2 second, preferably less than 0.05 second, apart such that the heated gas stream may pass without impedance from the plasma ionization zone to the reaction zone. By so positioning the two zones, energy from the plasma ionization zone may be radiated into the reaction zone and heat loss through the wall of passage 10 is minimized. To aid reactants, e.g., $TiCl_4$ and $O_2$, in the absorption of the radiant heat energy, carbon or sulfur particles may be added to the $TiCl_4$ stream prior to its introduction into the chamber 17 in which event sufficient excess oxygen must also be added to convert all of the carbon to carbon monoxide and carbon dioxide, and/or all of the sulfur to SO and $SO_2$.

In the operation of the foregoing apparatus and process, the hot gas stream from the plasma may cause thermal deterioration and breakdown of the ceramic burner tube 10. Likewise, the nucleating particles in the stream may cause frictional breakdown of the wall. In such case, the apparatus in FIGURE 3 should be so constructed and used as to minimize contact between the exceedingly hot gas stream emerging from the plasma arc and any wall, e.g., the wall of cylinder 10; that is, the gas stream should be restricted to the central portion of cylinder 10. One way of accomplishing this is by the widening of the passage 10, that is, by increasing the internal diameter of tube 10 such that the gas stream remains substantially in the center thereof with little or no contact with the cylinder wall. Such an embodiment also enables the gas stream to cool substantially by natural radiation and thereby enables any gas molecules which do contact the wall to be cooled. Another alternative is to employ a cool inert gas stream, e.g., nitrogen or another gas stream, e.g., oxygen, which is flowed over the internal surface of the burner tube 10 thereby serving as an insulator in between the wall surface and the hot gas stream from the plasma arc. The cooling gas stream may be either parallel or counterflow to the hot gas stream passing through the center of tube 10, parallel flow being the preferred embodiment, or the cooling gas stream may be introduced tangentially to the internal surface of tube 10 in a direction substantially transverse to the flow of the hot gas stream such that the cooling gas stream spirals over the internal surface of the tube 10.

Another alternative is to cool the hot gas stream promptly by introducing the secondary cooling gas more quickly, e.g., by reducing the length of the tube 10 between the lower portion of electrode 8 and the secondary gas inlet means 12.

Another technique is where the apparatus is constructed in a fashion which permits the walls in contact with the hot gases to be kept relatively cool and at temperatures at which the materials of construction will tolerate. For example, the ceramic material 11 can be internally cooled, e.g., by air or water, to provide and maintain the internal surface of cylinder 10 at a temperature not subject to attack by the gas stream.

It is to be understood that the foregoing apparatus is merely one way of practicing the invention and that other plasma arc apparatus, such as illustrated in FIGURES 1 and 2, may be employed.

Although FIGURE 3 illustrates the use of one tangential gas inlet 6, it is also possible to employ a series of tangential inlets such as is shown in U.S. Letters Patent 2,819,428. Also see U.S. Letters Patents 1,443,091 and 2,769,079.

The practice of this invention has hereinbefore been described and illustrated in conjunction with the burner depicted in FIGURE 3. However, it is useful when other burners are employed, including the type burner illustrated in FIGURE 1 or 2 of U.S. Letters Patent 3,068,113. Thus, where one reactant is first preheated partly or wholly by passage through the electric arc and is to be introduced into the reactor separately from the other reactant, the burner design of FIGURE 3 or U.S. Letters Patent 3,068,113 enables each reactant to be introduced in separate but concentric streams.

It is preferred that the center stream from such burner be the stream initially passed through the arc. The center reactant stream, preferably a stream containing oxygen which has been preheated by and contains nucleating particles from the plasma arc, is introduced at a linear velocity substantially higher than that of the other reactant stream such that the higher velocity center stream serves to suck and merge the lower velocity external stream into it thereby achieving instantaneous and intimate mixing of the two reactant streams and the nucleating particles as they contact the reaction zone. By introducing an inert gas stream, such as chlorine, internally concentric to one reactant and externally concentric to the other, premature reaction near the burner outlets is prevented.

When the reactant passed through the electric arc is oxygen, the nucleating agent supplied by the electrode and introduced into the stream will be present in the stream as a white metal oxide of the electrode metal. The metal particles from the electrode are promptly oxidized upon contact with the hot oxygen stream. If the material is silicon carbide or other metal salt, the carbide oxidizes and forms silicon oxide and carbon dioxide. The metal oxide and carbon dioxide are carried by the oxygen stream directly into the zone of reaction, the metal oxide therein nucleating the reaction of the metal halide and oxygen.

In one embodiment hereof, a small amount of metal halide, e.g., titanium tetrachloride, is included in the oxygen stream projecting to the plasma arc. This provides a source of nucleating agents with which to augment the nucleating agents generated from the electrode. It may also be utilized to provide chemically different nucleating agents, one such as aluminum oxide being supplied from the electrode and the other such as silicon oxide from the metal halide (silicon tetrachloride) included in the oxygen feed to the arc.

When a metal halide, e.g., titanium tetrahalide, is heated in the absence of oxygen by passage through the plasma arc, the electrode metal nucleating material emitted and introduced into the stream is not immediately oxidized to a white metal oxide until it contacts oxygen usually within the zone of reaction inside the reactor.

The inert gas stream may also be preheated by passage through the plasma arc in which case a substantial amount of the electrode metal picked up and carried by the inert stream begins to oxidize, instantaneously after ejection from the burner because of the close proximity of the oxygen and inert gas streams.

The term inert gas as employed herein refers to any gas which is inert to the reaction of the metal halide and oxygen. Examples of such inert gases are argon, nitrogen, helium, krypton, xenon, chlorine, carbon dioxide, or mixtures of same. It is to be understood that any one of these inert gases, or a mixture of them, may be heated by passage through the electric arc.

Where the gas is inert not only to the reactants of halide and oxygen, but inert as to the electrode as well, then metal from the electrode to provide for the nucleation effect is emitted into the inert gas stream by vaporization and friction of gas stream molecules. However, where the gas is not inert with respect to the metal electrode, then a reaction will take place between the electrode and the gas either before and/or after the metal particles are emitted into the gas stream.

If the inert gas stream is being heated, it is also possible to simultaneously preheat the reactant streams either by a separate electric arc process or by conventional means. If the reactants are to be premixed and added to the reactor in one stream, the temperature of the stream of the reactants should be maintained below about 400° C. in order to prevent premature reaction and encrustation of the burner tube through which the reactants are introduced.

Thus, in one embodiment of this invention, the reactants (e.g., titanium tetrahalide and oxygen) are premixed and introduced into the reactor at a temperature below the reaction temperature. An inert gas (e.g., nitrogen) which has been heated above the reaction temperature by passage through the plasma arc and which has been charged with nucleating electrode particles from one or more electrodes is introduced into the reactor and mixed with the reactants' mixture thereby causing pigmentary metal oxide to be formed.

The inert gas may be mixed with reactants in any of many ways. Thus, it may be introduced into the reaction zone at any desired point. One preferred technique introduces the inert gas stream in a direction which is transverse or perpendicular to the feed direction of the reactants' mixture stream, e.g., where one stream is introduced at the top of the reactor, the other stream is introduced at the side of the reactor transverse to the stream entering at the top.

In the performance of this invention, the reactants and the inert gas stream may be first introduced into the furnace or reactor and then heated by the plasma arc.

The plasma arc may be employed to heat the gas stream subjected thereto to temperatures initially as high as 30,000° C. The exact initial temperatures to which the gas stream should be heated as it passes through the plasma arc will be a function of the over-all heat losses in the system. Thus, where titanium tetrachloride and oxygen are being reacted in the vapor phase to produce pigmentary titanium dioxide, sufficient heat energy should be imparted to a gas stream (preferably the oxygen stream), such that this source of heat energy suffices to establish and maintain the reaction by providing in the reaction zone a temperature above 700° C., preferably in the range of 700° C. to 1600° C., taking into consideration the amount and thermal energy of the secondary oxygen which is introduced at inlet means 12.

Where the oxygen is being heated in apparatus illustrated in FIGURE 3 to an initial temperature of 1600° C. to 30,000° C. the quantity of secondary oxygen added at inlet means 12 ranges from 0 to 35 times that of the primary oxygen subjected to the plasma arc on a gram-mole basis.

Regardless of which gas stream is subjected to the plasma arc, the amount of oxygen employed in the process should preferably be in excess of stoichiometric proportions in order to obtain pigmentary metal oxide. The oxygen should be added in an amount ranging from 0.9 to 25 moles per mole of metal halide reactant.

In the preferred embodiment of this invention, the reactor pressure ranges from 10 to 150 pounds per square inch absolute. The primary gas stream subjected to the plasma arc is introduced at an absolute pressure ranging from 25 to 400 pounds per square inch. The secondary gas stream introduced downstream of the arc, e.g., at inlet 12 in FIGURE 3, is introduced at the reactor pressure of slightly above. The pressure drop through the plasma arc, e.g., from inlet 6 to the lowermost end of electrode 8 in FIGURE 3, ranges from 1 to 25 pounds per square inch. The pressure drop through the burner to the reaction zone ranges from 1 to 10 pounds per square inch.

The voltage requirements for the plasma arc electrodes will generally increase with an increase in gas flow, the exact voltage per volume of gas flow being a function of the overall configuration of the system. In the configuration disclosed in FIGURE 3, the voltage requirements may range from 250 to 2500 volts. The current requirements will range from 20 to 200 amps, preferably 80 to 110 amps, but will vary as the power demands change, in accordance wtih the required enthalpy of the gas stream.

The metal particles are emitted into the gas stream in an amount of about 0.00001 to about 20 mole percent based on the metal halide, e.g., $TiCl_4$, undergoing reaction. If the particles are being emitted into an oxygen stream, such that a white metal oxide is instantaneously formed, then the white metal oxide particles should be subsequently introduced into the metal halide reactant stream before the average white metal oxide particle size has increased beyond .15 micron in diameter.

Various methods are employed to control the rate at which the source of nucleating agent (e.g., the metal particles) is emitted from the electrode into the gas stream. This may be done by magnetic coils and cooling means as illustrated in FIGURE 3. However, other methods by which the generation of a nucleating agent from electrode vaporization and consumption may be utilized are rotating or moving electrodes (U.S. Letters Patents 2,638,443 and 2,850,662) and a shielding inert gas stream (U.S. Letters Patent 2,862,099). Also reference is made to U.S. Letters Patents 2,834,055, 2,858,411, 2,941,063, 2,973,426, Reissue 25,088.

In accordance with an embodiment in the practice of this invention, the rate at which the nucleating agent (i.e., metal particles) is provided from one or more plasma arc electrodes is regulated in accordance with the amount of nucleation desired in the oxidation by controlling the temperature of the electrode surface. The higher the surface temperature of the electrode, the greater the rate at which nucleating particles are eroded or emitted.

One expedient by which the surface temperature and rate of nucleation in the process is controlled involves the cooling of the electrode by circulating a liquid or gas coolant such as water in heat exchange relationship with the electrode. Thus, water or other suitable heat transfer media may be circulated in one or both chambers 2 and 7 of FIGURE 3. The rate of circulation and/or inlet and outlet temperatures of the coolant is adjusted by observation or test to control the rate at which nucleating source is introduced into the heated stream of gas as it passes over the electrode source en route to the reaction zone.

The electrode surface temperature may also be regulated by flowing a thin blanket of coolant gas, preferably an inert, such as nitrogen, adjacent to the surface. When lower rates of erosion or emission of nucleating source are required, the rate and/or temperature of the coolant gas flowed to and over the electrode are increased.

The electrode may partially consist of a porous material such as carbon or silicon and the coolant flowed directly through it. Where a non-porous material is used, the electrode may be provided with artificially prepared pores during the construction.

The erosion and emission of nucleating particles may also be controlled by properly correlating the electrode's geometrical shape and surface area. For example, when the rate of emission and/or erosion is too low, the arc current density at any given point on the electrode may be increased. This may entail decreasing the surface area of the electrode and/or increasing the arc current density.

Also, mechanically increasing the relative roughness of the electrode will increase the relative surface area exposed to the arc and the rate of erosion of the nucleating particles.

Nucleation can be further controlled by regulating the gap between the electrodes. By employing movable electrodes, the gap can be periodically adjusted. Thus, when more nucleation is desired, the gap between electrodes is reduced.

Movable electrodes can also be used to more evenly distribute the wear, heat and electron bombardment over the entire electrode surface. When the electrodes are slowed down or made stationary, there will be more relative erosion at one or more points on the electrode surface which will tend to increase the over-all average erosion of the electrode due to increased surface roughness.

A magnetic coil (positioned, for example, as shown in FIGURE 3) is particularly useful to control the rate of nucleation. The field created by the coil controls the rate at which the arc travels over the electrode surface. When the rate of nucleation is too low, the current to the coil and the magnetic flux of the field are decreased and the rate of arc travel is also decreased and the rate of nucleation is increased. Conversely, as the nucleation rate becomes too high (or is otherwise desirably decreased), the rate of arc travel is accelerated.

In the further practice of this invention, it is also desirable to add various aromatic organic compounds to the process as set forth in Canadian Patent 662,923 and U.S. Letters Patent 2,968,529 issued to Wilson. Likewise, sulfur or sulfur-containing compounds could be added to the oxygen stream as mentioned in U.S. Patent 3,105,742.

Thus, in the practice of this invention, additional nucleating agents may be added to the process independently of that emitted from the electrode. It is envisioned that a portion of the nucleating agent can be added by electrode erosion while a further portion is added from other sources directly into the reaction zone or into other reactant or inert streams not being heated by the arc.

If the invention is practiced by passing an oxygen stream through the plasma arc, activated oxygen can be produced. Activated oxygen is defined as oxygen in a dissociated state or atomic form. Such oxygen is also obtained by the liberation in the nascent state from a compound containing an oxygen atom in loose or relatively unstable combination. Examples of such compounds are ozone, oxides, and peroxides.

In either case, the activated oxygen has a relatively short life or existence before it recombines to form molecular oxygen. Accordingly, it is important to bring the activated oxygen into the presence of the metal halides rather promptly before recombination of the activated oxygen takes place. The advantages and benefits of employing activated oxygen in a metal oxide process are defined along with other particulars in U.S. Letters Patent 3,147,077.

In FIGURE 4 there is shown an electric circuit which may be used in the present invention. More particularly, there is shown power source $E_1$, $E_2$, $E_3$, reactors $X_1$, $X_2$, $X_3$, and a transformer consisting of primary winding 44 and secondary winding 45. Leads from the secondary winding 45 are connected to a rectifier 46. In lead 41 from the rectifier 46 to electrode 48, there is positioned a choke coil 47. Choke coil 47 comprises many turns of water cooled copper tubing with an air core. Lead 42 connects the rectifier 46 to electrode 49 and also to ground 43.

In FIGURE 5 there is shown a series of four coaxial electrode rings 50, 51, 52, and 53 connected to a three-phase power circuit. Broken lines 5A, 5B, and 5C represent the plasma arc discharge respectively from ring electrode 50 to 51, 51 to 52, and 52 to 53. Since arc 5C will be the hottest arc, electrodes 52 and 53 will be subjected to higher surface temperatures than electrodes 50 and 51.

The electrodes should be positioned in a confined chamber (not shown). A gas may be supplied to the chamber axially with respect to the electrodes or tangentially in a swirling stream as in FIGURE 3. Better arc behavior and stability are obtained with a swirling high velocity stream having a velocity of at least one-tenth the speed of sound, preferably greater than one-half, at the particular gas temperature.

The aforementioned plasma arc pigmentary metal oxide process is advantageous not only in being an economical means of heating but likewise in terms of materials handling. Thus, in the conventional vapor phase oxidation processes for producing pigmentary metal oxide, heat is supplied by the combustion of carbon monoxide and the oxygen, thereby resulting in the dilution of the product stream with carbon dioxide. In the aforementioned process, this dilution problem is overcome and the product stream after a reactor retention time above 10 seconds comprises pigmentary $TiO_2$, chlorine, and some unreacted $TiCl_4$. After removal of the titanium dioxide, e.g., by a bag filter or cyclone separator, the chlorine gas and $TiCl_4$ are sent directly to a chlorinator in which rutile ore is being chlorinated to $TiCl_4$ for use in the vapor phase oxidation process for producing pigmentary $TiO_2$. In other words, the gaseous components of the product stream can be recycled without distillation directly to the chlorinator system used to supply $TiCl_4$ with the vapor phase oxidation process.

In a further embodiment of this invention, apparatus as illustrated in FIGURE 3 is utilized in conjunction with a third electrode (not illustrated) preferably located downstream of the electrode 8. The electrodes 1 and 8 are constructed out of a metal which does not form a white oxide, e.g., copper, graphite, silver alloy, whereas the downstream electrode is constructed out of a white oxide forming metal. The auxiliary electrode is of a small diameter, .01 to 0.50 inch, with a current range of 25 to 125 amps such that a controllable rate of aluminum vapor, 340 grams to 2724 grams per hour, can be released to the heated oxygen stream.

The auxiliary electrode may be located at any preferred point in the process, e.g., upstream of the main electrodes, particularly where the configuration of FIGURE 1 or 2 is utilized. Furthermore, the electrode can be located directly in the burner tube 10 downstream of the secondary oxygen inlet 12 or directly within the main reactor downstream of the burner.

Reference is made to FIGURE 6 wherein there is shown an electrode 61, a cylinder 60, and rod 62 positioned in a chamber 63. Chamber 63 may serve as either a vapor phase oxidation zone or as a passage 10 as in FIGURE 3.

Cylinder 60 and/or rod 62 may serve as electrodes. Thus, in the embodiment of FIGURE 6, there are four possible electrode combinations—61 and 62, 60 and 62, 61 and 62, or 60, 61, and 62.

Rod 62 is constructed out of a consumable material, preferably a low melting metal such as aluminum, such that nucleating particles are emitted into the gas stream flowing from cylinder 60. Rod 62 may also be positioned downstream of or directly within a radio frequency arc.

In the practice of this invention, the arc is initiated by a striker mechanism, usually constructed out of carbon or copper, which is inserted temporarily and withdrawn. Thus in FIGURE 3, a solid carbon rod is inserted so as to cause temporary current flow from the cathode, e.g., electrode 1, to the bottom portion of swirl chamber 5. The striker rod is then withdrawn leaving an arc across electrode 1 and swirl chamber 5. This arc is gradually shifted by the incoming tangentially introduced gas such that it flows from electrode 1 to electrode 8.

In a further practice, a solid metal or carbon rod is fixed between electrodes 1 and 8 and is then permitted to be burned out and consumed by the resulting high current flow. Such rod may also be used as a source of nucleating material by constructing it out of a metal which will form a white oxide.

A further method of introducing a nucleating agent to a plasma arc process is by introducing a gas or powder directly into the plasma arc in combination with or independent of the gas stream being subjected to the arc. Apparatus by which this may be accomplished is illustrated in FIGURE 4 of U.S. Letters Patent 2,858,411.

The following are typical examples.

EXAMPLE I

In a $TiO_2$ vapor phase oxidation process utilizing apparatus as illustrated in FIGURE 3, an arc is struck between the electrodes 1 and 8, the requirements of the arc being 94 amps and 670 volts. Electrode 1 is constructed out of copper and electrode 8 out of aluminum.

Oxygen at about 20° C. is then tangentially introduced into the swirl chamber at inlet 6 at 75 pounds per square inch absolute pressure and a rate of 24 gram-moles per minute. Metallic aluminum particles are emitted from electrode 8 at the rate of 23 grams per minute into the $O_2$ stream and are immediately converted to $Al_2O_3$. The calculated temperature of the oxygen stream immediately after its passage through the arc is about 2650° C. which is equivalent to an enthalpy of about 1750 B.t.u. (British thermal units) per pound of oxygen. The calculation is based on a 75 percent efficiency for conversion of the power input to the electrodes to energy transmitted to the oxygen stream.

The heated oxygen stream is then mixed with a secondary supply of oxygen introduced through inlet nozzle 12 at about 20° C. and 17 pounds per square inch absolute pressure and at the rate of about 13.2 gram-moles per minute at 20° C. The resulting temperature of the two oxygen streams after mixing is calculated at about 2150° C. or an enthalpy of 1100 B.t.u. per pound of oxygen.

The resulting oxygen mixture is fed as a continuous stream into reactor chamber 17. Simultaneously there is introduced 32 gram-moles per minute to $TiCl_4$ at 140° C. through tube 15 and 5 gram-moles per minute of chlorine at 150° C. through tube 13 to provide a chlorine shroud between the oxygen and the $TiCl_4$ streams. The total oxygen is thus added at 16 mole percent excess based on the amount theoretically required to convert $TiCl_4$ to $TiO_2$. Liquid $SiCl_4$ is added to the $TiCl_4$ stream before its introduction to the reactor in an amount sufficient to promote the formation of pigmentary pigment, about 0.18 gram-mole per minute.

The oxygen and $TiCl_4$ streams merge and react at a point within the reactor removed from the concentric burner tubes due to the chlorine shroud. A thermocouple located in the upper portion of the reaction zone measures the therein prevailing temperature at 1160° C. The absolute pressure in the reactor is 16 pounds per square inch.

After an average reactor retention time of approximately 10 to 15 seconds, the pigmentary $TiO_2$ product is withdrawn at the bottom of the reactor. A typical analysis for a product sample during an 8-hour run is represented in Table I.

TABLE I

Tinting strength _____Reynolds scale__ 1660
Rutile content _____percent__ 99.0
$SiO_2$ in product _____percent by weight___ 0.41
$Al_2O_3$ in product _____do____ 1.70

EXAMPLE II

In a vapor phase oxidation process utilizing the apparatus of FIGURE 3, an arc is struck between electrodes 1 and 8, the requirements of the arc being 98 amps and 1000 volts. Both electrodes are constructed out of copper.

Oxygen at about 30° C. is then tangentially introduced at about 20° C. and 100 pounds per square inch absolute pressure at a rate of 34.9 gram-moles per minute. The calculated temperature of the oxygen stream immediately after its passage through the arc is 2650° C. equivalent to an enthalpy of about 1750 B.t.u. per pound of oxygen.

The heated oxygen stream is then mixed with secondary oxygen introduce through inlet nozzle 12 at 20° C. and 20 pounds per square inch absolute pressure and at the rate of 4.1 gram-moles per minutes. The resulting temperature of the two oxygen streams after mixing is calculated at about 2480° C. or an enthalpy of about 1500 B.t.u. per pound of oxygen.

The resulting mixture is then fed as a continuous stream into reactor chamber 17. Simultaneously there is introduced 32 gram-moles per minute of $TiCl_4$ at 120° C. through tube 15 and 6 gram-moles per minute of chlorine at 150° C. through tube 13 thereby providing a chlorine shroud between the concentric oxygen and $TiCl_4$ streams. The total oxygen is thus added at about 22 mole percent excess based on the amount theoretically required to convert $TiCl_4$ to $TiO_2$. Liquid $SiCl_4$ is added to the $TiCl_4$ stream at the rate of 0.20 gram-moles per minute prior to the introduction of the $TiCl_4$ into the reactor. Vaporous $AlCl_3$ is added to the upper portion of reactor chamber 17 near the burner at the rate of 0.80 gram-moles per minute.

The $O_2$ and $TiCl_4$ streams merge and react at a point within the reactor removed from the concentric burner tubes. A thermocouple located in the upper portion of the reaction zone measures the therein prevailing temperature at 1300° C. The absolute pressure in the reactor is 16 pounds per square inch.

After an average reactor retention time of 10 to 12 seconds, the pigmentary $TiO_2$ product is withdrawn at the bottom of the reactor. A typical analysis for a product sample is represented in Table II.

TABLE II

| | |
|---|---|
| Tinting strength _____Reynolds scale__ | 1720 |
| Rutile content _____percent__ | 99.2 |
| $SiO_2$ in product _____percent by weight__ | 0.47 |
| $Al_2O_3$ in product _____do____ | 1.60 |

EXAMPLE III

In a $TiO_2$ vapor phase oxidation process utilizing the apparatus illustrated in FIGURE 3, an arc is struck between electrodes 1 and 8, the requirements of the arc being 95 amps and 990 volts. Electrodes 1 and 8 are both constructed out of copper.

Oxygen at about 20° C. is tangentially introduced into the swirl chamber through inlet 6 at 60 pounds per square inch absolute pressure and a rate of 30 gram-moles per minute. The calculated temperature of the oxygen stream immediately after its passage through the arc is about 2650° C. which is equivalent to an enthalpy of 1750 B.t.u. per pound of oxygen.

The heated oxygen stream is then mixed with a secondary supply of oxygen introduced through inlet nozzle 12 at about 20° C. and 18 pounds per square inch absolute pressure and at the rate of 8 gram-moles per minute. The resulting temperature of the two oxygen streams after mixing is calculated at about 2350° C.

The resulting oxygen mixture is then brought into continuous contact with an auxiliary electrode inserted into the lower portion of burner tube 10 below nozzle 12. The electrode is .035 inch in diameter, constructed out of pure aluminum, and is supplied with a current of 75 amps such that 25 grams per minute of aluminum vapor are released from the electrode at a continuous rate into the oxygen stream, the aluminum being immediately oxidized to $Al_2O_3$.

The oxygen mixture containing $Al_2O_3$ is then continuously fed into reactor chamber 17 while simultaneously there is introduced 32 gram-moles per minute of $TiCl_4$ at 170° C. through tube 15 and 5 gram-moles per minute of chlorine at 170° C. through tube 14 thereby providing a chlorine shroud between the oxygen and $TiCl_4$ stream. The total oxygen is thus added at about 19 mole percent excess based on the amount of oxygen required theoretically to convert $TiCl_4$ to $TiO_2$. Liquid $SiCl_4$ is added at a rate of 0.19 gram-moles per minute to the $TiCl_4$ stream before the $TiCl_4$ is fed to the reactor.

The $O_2$ and $TiCl_4$ streams merge and react within the reactor chamber 17 at a point remote from the burner. A thermocouple in the upper portion of the reaction zone measures the therein prevailing temperature as 1250° C. The absolute pressure in the reactor is 16 pounds per square inch.

After an average retention time in the reactor above 10 seconds, the pigmentary $TiO_2$ product is withdrawn from the reactor. A typical analysis is represented in Table III.

TABLE III

| | |
|---|---|
| Tinting strength _____Reynolds scale__ | 1700 |
| Rutile content _____percent__ | 99.0 |
| $SiO_2$ in product _____percent by weight__ | 0.43 |
| $Al_2O_3$ in product _____do____ | 1.85 |

EXAMPLE IV

In a $TiO_2$ vapor phase oxidation process utilizing apparatus as illustrated in FIGURE 3, a direct current arc is struck between the electrodes 1 and 8, the requirements of the arc being 99 amperes and 875 volts. Electrode 1 is constructed out of a metallic alloy consisting essentially of 79.0 percent by weight silver and 21.0 percent by weight copper. Electrode 8 is constructed out of aluminum.

Oxygen is tangentially introduced into the swirl chamber at inlet 6 at 20° C. and 80 pounds per square inch absolute pressure and a rate of 37 gram-moles per minute. Simultaneously, electrodes 1 and 8 are cooled by separate streams of water flowing respectively through chambers 2 and 7 at 13 to 15 gallons per minute and 70° F. The temperature of the water exiting from chamber 2 is 72° to 74° F. The temperature of the water exiting from chamber 7 is 76° to 82° F.

Metallic aluminum particles are emitted from electrode 8 at the rate of 23 grams per minute into the oxygen stream.

The temperature of the oxygen stream immediately after passage through the arc is about 2150° C., equivalent to an enthalpy of 1100 B.t.u. per pound of oxygen.

The heated oxygen stream is flowed as a continuous stream directly into the reaction chamber 17 without being diluted and cooled with secondary oxygen as in the foregoing examples. Simultaneously there is introduced 33 gram-moles per minute of $TiCl_4$ at 500° C. through tube 15 (annulus 19) and 7 gram-moles per minute to chlorine at 500° C. through tube 13 (annulus 18). Liquid $SiCl_4$ is added to the $TiCl_4$ before the introduction of the $TiCl_4$ to the reaction chamber, the $SiCl_4$ being added in an amount sufficient to promote the formation of pigmentary $TiO_2$, about 0.19 gram-mole per minute.

The oxygen and $TiCl_4$ merge and react within the chamber 17. The temperature of the reaction zone is measured at 1140° C. The absolute pressure in the reactor is 16 pounds per square inch.

After an average reactor retention time of approximately 10 to 15 seconds, pigmentary $TiO_2$ is withdrawn at the bottom of the reactor. A typical analysis for a product sample during an 8-hour run is represented in Table IV.

TABLE IV

| | | |
|---|---|---|
| Tinting strength | Reynolds scale | 1740 |
| Rutile content | percent | 99.5 |
| $SiO_2$ in product | percent by weight | 0.43 |
| $Al_2O_3$ in product | do | 1.69 |

The tinting strength of the pigmentary $TiO_2$ is determined in each of the examples in accordance with A.S.T.M. D–332–26, "1949 Book of A.S.T.M. Standards," part 4, page 31, published by American Society for Testing Material, Philadelphia 3, Pa.

It is to be understood that any of the above teachings may be employed in any vapor phase oxidation process for providing a pigmentary metal oxide either in the absence or presence of a fluidized bed.

Although this invention has been described with particular reference to the production of pigmentary $TiO_2$, it is equally applicable to the production of other metal oxides, particularly the white oxides of those metals hereinbefore disclosed, more particularly $SiO_2$.

The above description of the invention has been given for purposes of illustration and not limitation. Various changes and modifications which fall within the spirit of the invention and scope of the appended claims will become apparent to the skilled expert in the art. Thus, it will be understood that the invention is in no way to be limited except as set forth in the following claims.

We claim:

1. In a process for preparing white pigmentary metal oxide by vapor phase oxidation of metal halide with at least a stoichiometric amount of oxygen-containing gas in a reaction zone wherein said oxidation is conducted in the presence of metallic white oxide and pigmentary metal oxide is removed from the reaction zone, the improvement which comprises introducing a gas into the space between two spaced coaxial cylindrical electrodes while conducting a discharge of electrical energy therebetween such that at least a substantial portion of said gas spirally passes within and through both electrodes and is heated by said discharge of electrical energy to temperatures of from 1600° C. to 30,000° C., and forwarding said heated gas to said reaction zone.

2. A process according to claim 1 wherein the gas heated by said discharge of electrical energy is selected from the group consisting of vaporous metal halide, oxygen-containing gas and inert gas.

3. In a process for preparing white pigmentary metal oxide by vapor phase oxidation of metal halide with at least a stoichiometric amount of oxygen-containing gas in a reaction zone wherein said oxidation is conducted in the presence of metallic white oxide and pigmentary metal oxide is removed from the reaction zone, the improvement which comprises introducing oxygen-containing gas into the space between two spaced coaxial cylindrical electrodes while conducting a discharge of electrical energy therebetween such that at least a substantial portion of said oxygen-containing gas spirally passes within and through both electrodes and is heated by said discharge of electrical energy to temperatures of from 1600° C. to 30,000° C., mixing said heated oxygen-containing gas with metal halide, and forwarding the resulting mixture to said reaction zone.

4. In a process of preparing pigmentary titanium dioxide by vapor phase oxidation of titanium tetrahalide selected from the group consisting of titanium tetrachloride, titanium tetrabromide and titanium tetraiodide with at least a stoichiometric amount of an oxygen-containing gas in a reaction zone at temperatures above 500° C. wherein said oxidation is conducted in the presence of metallic white oxide and pigmentary titanium dioxide is removed from the reaction zone, the improvement which comprises introducing oxygen-containing gas into the space between two spaced coaxial cylindrical electrodes while conducting a discharge of electrical energy therebetween such that at least a substantial portion of said oxygen-containing gas spirally passes within and through both electrodes and is heated by said discharge of electrical energy to temperatures sufficient to sustain said oxidation reaction, mixing said heated oxygen-containing gas with titanium tetrahalide, and forwarding the resulting mixture to said reaction zone.

5. A process according to claim 4 wherein the discharge of electrical energy is an electric arc.

6. A process according to claim 4 wherein the oxygen-containing gas is oxygen and said oxygen is tangentially introduced into the space between the electrodes.

7. A process according to claim 4 wherein said oxygen-containing gas spirally passes through first one electrode and then passes through the other.

8. A process according to claim 4 wherein the metallic white oxide is at least one element selected from the group consisting of aluminum, silicon, zirconium, and titanium.

9. In a process of preparing pigmentary titanium dioxide by vapor phase oxidation of titanium tetrachloride with at least a stoichiometric amount of oxygen in a reaction zone at temperatures above 500° C., wherein said oxidation is conducted in the presence of a nucleating amount of metallic white oxide and pigmentary titanium dioxide is removed from the reaction zone, the improvement which comprises introducing oxygen into the space between two spaced coaxial cylindrical electrodes while conducting an electric arc therebetween such that at least a substantial portion of said oxygen spirally passes through both electrodes and is heated by said electric arc to temperatures of from 1600° C. to 30,000° C., mixing said heated oxygen with titanium tetrachloride, and forwarding the resulting mixture to said reaction zone.

10. In a process of preparing pigmentary titanium dioxide by vapor phase oxidation of titanium tetrachloride with at least a stoichiometric amount of oxygen in a reaction zone at temperatures above 500° C., wherein said oxidation is conducted in the presence of a nucleating amount of metallic white oxide and pigmentary titanium dioxide is removed from the reaction zone, the improvement which comprises introducing oxygen into the space between two spaced coaxial cylindrical electrodes while conducting an electric arc therebetween such that at least a substantial portion of said oxygen spirally passes within and through both electrodes and is heated by said electric arc to temperatures of from 1600° C. to 30,000° C., mixing said heated oxygen with titanium tetrachloride, and forwarding the resulting mixture to a reaction zone that is coaxial with said electrodes.

References Cited

UNITED STATES PATENTS

| | | | |
|---|---|---|---|
| 2,768,061 | 10/1956 | Cook et al. | 23—153 |
| 2,921,892 | 1/1960 | Casey | 204—164 |
| 3,114,691 | 12/1963 | Case | 204—171 |
| 3,275,411 | 9/1966 | Freeman et al. | 23—202 |

EARL C. THOMAS, *Primary Examiner.*

EDWARD STERN, *Assistant Examiner.*

U.S. Cl. X.R.

23—1, 21, 139, 140, 142, 144, 146, 148, 149, 165, 182, 183, 186, 200, 345; 106—300